United States Patent [19]
Sato et al.

[11] Patent Number: 5,588,208
[45] Date of Patent: Dec. 31, 1996

[54] METHOD OF ASSEMBLING SET OIL RING ON PISTON

[75] Inventors: Yutaka Sato; Koichi Morita; Shuzo Fujimoto; Satoru Ichihashi; Kohji Ohsawa, all of Sayama, Japan

[73] Assignee: Honda Giken Kogyo Kabushiki Kaisha, Tokyo, Japan

[21] Appl. No.: 357,270

[22] Filed: Dec. 13, 1994

[30] Foreign Application Priority Data

Dec. 22, 1993 [JP] Japan ................... 5-325364

[51] Int. Cl.$^6$ ................................... B23P 15/00
[52] U.S. Cl. ......................... 29/888.044; 29/222
[58] Field of Search ............ 29/888.044, 888.04, 29/791, 222–224, 235, 453, 466, 229; 92/107, 109

[56] References Cited

U.S. PATENT DOCUMENTS

| | | | |
|---|---|---|---|
| 4,967,459 | 11/1990 | Garnier | 29/222 |
| 5,259,109 | 11/1993 | Fefeu et al. | 29/771 |
| 5,303,465 | 4/1994 | Fujimoto et al. | 29/791 |

FOREIGN PATENT DOCUMENTS

| | | | |
|---|---|---|---|
| 0137849 | 10/1980 | Japan | 29/222 |
| 0196329 | 8/1988 | Japan | 29/222 |

*Primary Examiner*—Peter Vo
*Assistant Examiner*—Khan Nguyen
*Attorney, Agent, or Firm*—Armstrong, Westerman, Hattori, McLeland & Naughton

[57] ABSTRACT

A set oil ring to be assembled into a piston ring groove is made up of a spacer ring and a pair of side rail rings to be placed on both sides thereof. In assembling one of the side rail rings into a first groove portion which is on an upper side of the spacer ring in the piston ring groove, a guide member, which can be moved up and down for fitting the rings onto a piston, is moved to a first fitting position which is substantially the same level as the groove wall surface of the first groove portion. A restricting member is disposed oppositely in front of the guide member while leaving a clearance facing the first groove portion. One of the side rail rings is pushed out of the front end of the guide member in a condition in which split end portions of the spacer ring are restricted by the restricting member so as not to overlap. In assembling the other of the side rail rings into a second groove portion, which is on the lower side of the spacer ring in the piston ring groove, the guide member is moved to a second fitting position in which the front end of the guide member becomes substantially equal in level to that surface of the spacer ring which is on the side of the second groove portion. The other of the side rail rings is pushed out of the front end of the guide member in a condition in which the split end portions of the spacer ring are restricted by an internal surface of the guide member so as not to overlap.

4 Claims, 7 Drawing Sheets

METHOD OF ASSEMBLING SET OIL RING ON PISTON

BACKGROUND OF THE INVENTION

1. Field of the Invention

The present invention relates to a method of assembling, into a piston ring groove of a piston, a set oil ring which comprises a spacer ring and a pair of side rail rings to be placed on both sides of the spacer ring.

2. Description of Related Art

In assembling a set oil ring, there has conventionally been employed the following procedure. Namely, a spacer ring is first assembled into a piston ring groove. Then, each side rail ring is sequentially assembled into each groove portion which is formed between the spacer ring and upper and lower groove wall surfaces, respectively, of the piston ring groove.

The assembling of the spacer ring and the side rail rings is carried out in the following manner as disclosed in Japanese Published Examined Patent Application No. 2020/1983, Japanese Published Examined Patent Application No. 19376/1986, Japanese Published Examined Utility Model Registration Application No. 16020/1986 or the like. Namely, a guide member which can be externally fitted onto an external surface of a piston is positioned relative to the piston, and then the rings which are mounted on the periphery of the guide member are pushed out of a front end of the guide member. As the guide member, there are prepared three kinds, i.e., one for the spacer ring, one for the side rail ring on the upper side and one for the side rail ring on the lower side. In each of the assembly stations, which are different from each other, the corresponding guide member is used to thereby separately assemble the spacer ring, the side rail ring on the upper side and the side rail ring on the lower side. This method has, however, a disadvantage in that the length of the assembly line becomes long and the equipment cost becomes high.

In order to solve this disadvantage, the applicants of the present application have earlier proposed the following method and apparatus in Japanese Patent Application No. 328238/1992 (corresponding to U.S. Pat. No. 5,303,465). Namely, for the purpose of definition, out of the groove wall surfaces inside a piston ring groove, the one on the side to come first in the assembling direction of the guide member relative to the piston (i.e., on the upper side) is called, "the first groove wall surface", and the one ahead, or in front, of the first groove wall surface (i.e., on the lower side) is called, "the second groove wall surface". A pair of side rail rings are mounted on a periphery of the guide member which can be fitted onto the external surface of the piston, the side rail rings are sequentially pushed out of the front end of the guide member in a condition in which the guide member is fitted onto the external surface of the piston. In this manner, the side rail rings are sequentially assembled into the first groove portion to be formed between the spacer ring that has been assembled into the piston ring groove and the first groove wall surface, and into the second groove portion to be formed between the above-described spacer ring and the second groove wall surface. The pair of side rail rings are thus assembled in a single assembly station by using a single guide member.

In this method and apparatus, the following arrangement have been made. Namely, the guide member is positioned relative to the piston such that the front end of the guide member is on substantially the same level as the first groove wall surface of the piston ring groove. The side rail ring that is positioned on the side of the front end of the guide member is first pushed out of the front end thereof in a condition in which a restricting member is oppositely disposed while leaving, in front of the guide member, a clearance or a space which faces or corresponds to the first groove portion. The side rail ring on the front side is thus assembled into the first groove portion through the clearance. Then, in a condition in which the restricting member is retracted, the side rail ring on the rear (i.e., upper) side is assembled into the second groove portion by utilizing the undulating phenomenon thereof.

By the way, the spacer ring is able to produce only a small self-maintaining force (i.e., the force to hold it fast in its position) relative to the piston ring groove. As a result, when the side rail rings are assembled into the groove portions, the spacer ring may move by the dragging or pulling by the side rail rings and consequently split end portions of the spacer ring sometimes get overlapped with each other.

In the method of the above-described proposal by the same applicants, when the side rail ring on the front side is assembled, the overlapping of the split end portions may be prevented by restricting the spacer ring with the restricting member. When the side rail ring on the rear side is assembled, however, the spacer ring can no longer be restricted. Therefore, it so happens that the split end portions of the spacer ring sometimes get overlapped.

In view of the above-described point, the present invention has an object of providing a method of assembling in which, like in the above-described method of the above-described proposal by the same applicants, the side rail rings can be assembled in a single assembly station by using a single guide member and, at the same time, in which the overlapping of the split end portions of the spacer ring can surely be prevented.

SUMMARY OF THE INVENTION

In order to attain the above and other objects, the present invention is a method of assembling a set oil ring on a piston, the set oil ring comprising a spacer ring and a pair of side rail rings to be placed on both sides of the spacer ring. The method comprises mounting the pair of side rail rings on a periphery of a guide member which can be fitted onto an external surface of the piston; sequentially pushing the pair of side rail rings out of a front end of the guide member, in a condition in which the guide member is kept fitted onto the external surface of the piston, into a first groove portion and a second groove portion, said first groove portion being formed between the spacer ring as assembled into a piston ring groove and a first groove wall surface which is defined, out of two groove wall surfaces on both sides of the piston ring groove, as a first one as seen in the direction of fitting the guide member onto the piston, and said second groove portion being formed between the spacer ring and a second groove wall surface which is defined as the remaining second one; wherein the improvement comprising: in assembling one of the side rail rings into the first groove portion, moving the guide member to a first fitting position which is at substantially the same level as the first groove wall surface; disposing a restricting member oppositely in front of the guide member while leaving a clearance facing the first groove portion; and pushing the one of the side rail rings out of the front end of the guide member in a condition in which split end portions of the spacer ring are restricted by the restricting member so as not to overlap; and in assembling the other of the side rail rings into the second groove portion, moving the guide member to a second fitting position in which the front end of the guide member becomes substantially equal in level to that surface of the spacer ring which is on the side of the second groove portion; and pushing the other of the side rail rings out of the front end of the guide member in a condition in which the split end portions of the spacer ring are restricted by an internal surface of the guide member so as not to overlap.

In assembling the above-described one of the side rail rings into the first groove portion, the spacer ring is restricted by the restricting member and therefore the overlapping of the split end portions can be prevented. Further, in assembling the other of the side rail rings into the second groove portion, the spacer ring is restricted by the internal surface of the guide member and therefore the overlapping of the split end portions can be prevented.

By the way, the following steps may also be employed. Namely, the guide member is first moved to the first fitting position. The side rail ring which is positioned on the front side of the guide member is pushed out of the front end of the guide member to thereby assemble it into the first groove portion. Then, after the restricting member is retracted, the guide member is moved to the second fitting position. The side rail ring, which is on the rear side, is then pushed out of the front end of the guide member to thereby assemble it into the second groove portion. In these steps, however, since the side rail rings are very thin, there is a possibility that the side rail ring on the rear side is pushed out simultaneously with pushing out the side rail ring on the front side. Further, since it is necessary to wait for the retraction of the restricting member before the guide member can be moved to the second fitting position, the working efficiency is lowered.

On the other hand, if an arrangement is made such that, in assembling the set of side rail rings, the guide member is first moved to the second fitting position, a pushing member which abuts the side rail ring on the rear side of the guide member is pushed towards the front end of the guide member in a condition in which the restricting member is interposed into a space between the side rail ring on the front side of the guide member and the side rail ring on the rear side thereof, whereby the side rail ring on the front side is pushed via the restricting member out of the front end of the guide member into the second groove portion, thereafter the guide member is moved to the first fitting position in a condition in which the pushing member and the restricting member are restricted to the position in which the side rail ring on the front side is pushed, and the guide member is pulled out of the side rail ring on the rear side, whereby the side rail ring on the rear side is assembled into the second groove portion, the side rail ring on the rear side can be positively prevented from being pushed out together with the side rail ring on the front side. In addition, after the side rail ring on the front side has been assembled into the second groove portion, the side rail ring on the rear side can be assembled into the first groove portion simply by moving only the guide member without moving the pushing member and the restricting member. The working efficiency can therefore be improved.

Further, an arrangement may also be made such that the spacer ring and the pair of side rail rings are mounted on the periphery of the guide member in an order, towards the front end of the guide member, of the spacer ring in a front endmost position followed by the pair of the side rail rings, and the spacer ring is pushed out of the front end of the guide member before assembling the pair of side rail rings. In this case, if an arrangement is made that the spacer ring is pushed out of the front end of the guide member in a condition in which an engaging member, which can be engaged with the split ends of the spacer ring, is disposed in front of the guide member so that the spacer ring is assembled into the piston ring groove while restricting the position of the split ends by the engaging member, the overlapping of the split end portions at the time of assembling the spacer rings can advantageously be prevented.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 7A:
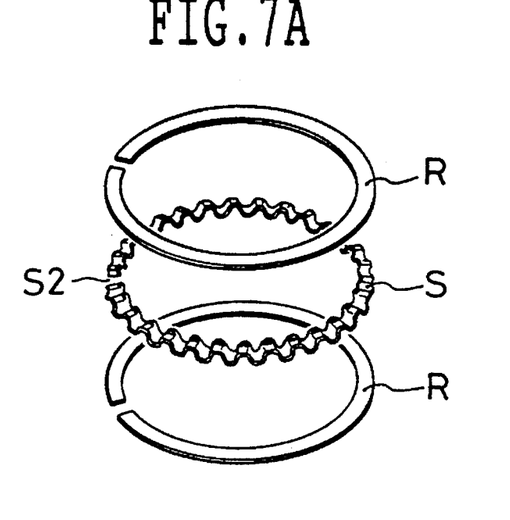
FIG. 7A is an exploded perspective view of a set oil ring.
Figure 7B:
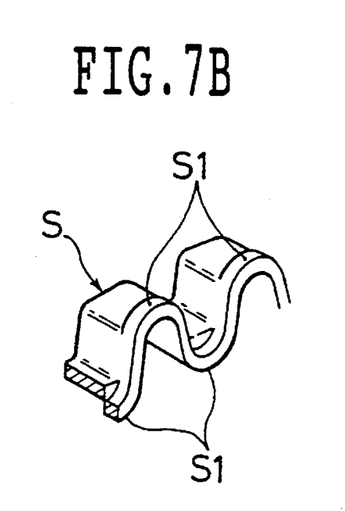
FIG. 7B is a partially enlarged perspective view of a spacer ring.
Figure 7C:
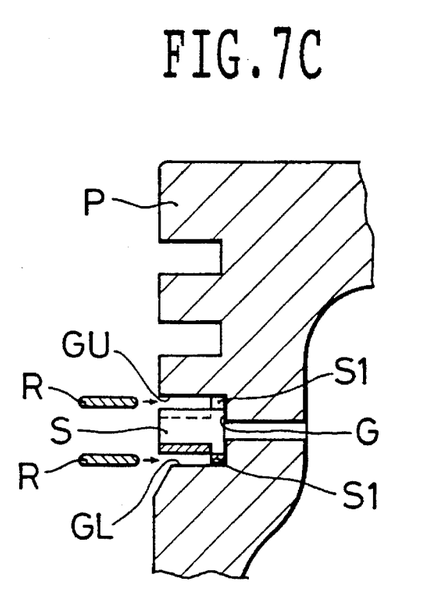
FIG. 7C is a sectional view showing the condition in which the set oil ring is assembled.

The illustrated embodying example is one in which the present invention is applied to the steps of assembling a set oil ring which is made up, as shown in FIG. 7A, of a spacer ring S and a pair of side rail rings R, R to be placed on both the upper and the lower sides thereof into a third stage piston ring groove G of a piston P. The spacer ring S is formed by bending an annular plate member into a wave form in the circumferential direction, as shown in FIG. 7A. As shown in FIG. 7B, a small projection S1 is formed on an internal end portion of each of the upward and downward tip portions of the waves. It is thus so arranged that, when the spacer ring S is assembled into the piston ring groove G, a groove portion or clearance GU, GL is formed, as shown in FIG. 7C, respectively, between the spacer ring S and the upper and the lower groove wall surfaces in the piston ring groove G. The upper and the lower side rail rings R, R are thus assembled into respective groove portions GU, GL.

Figure 1:
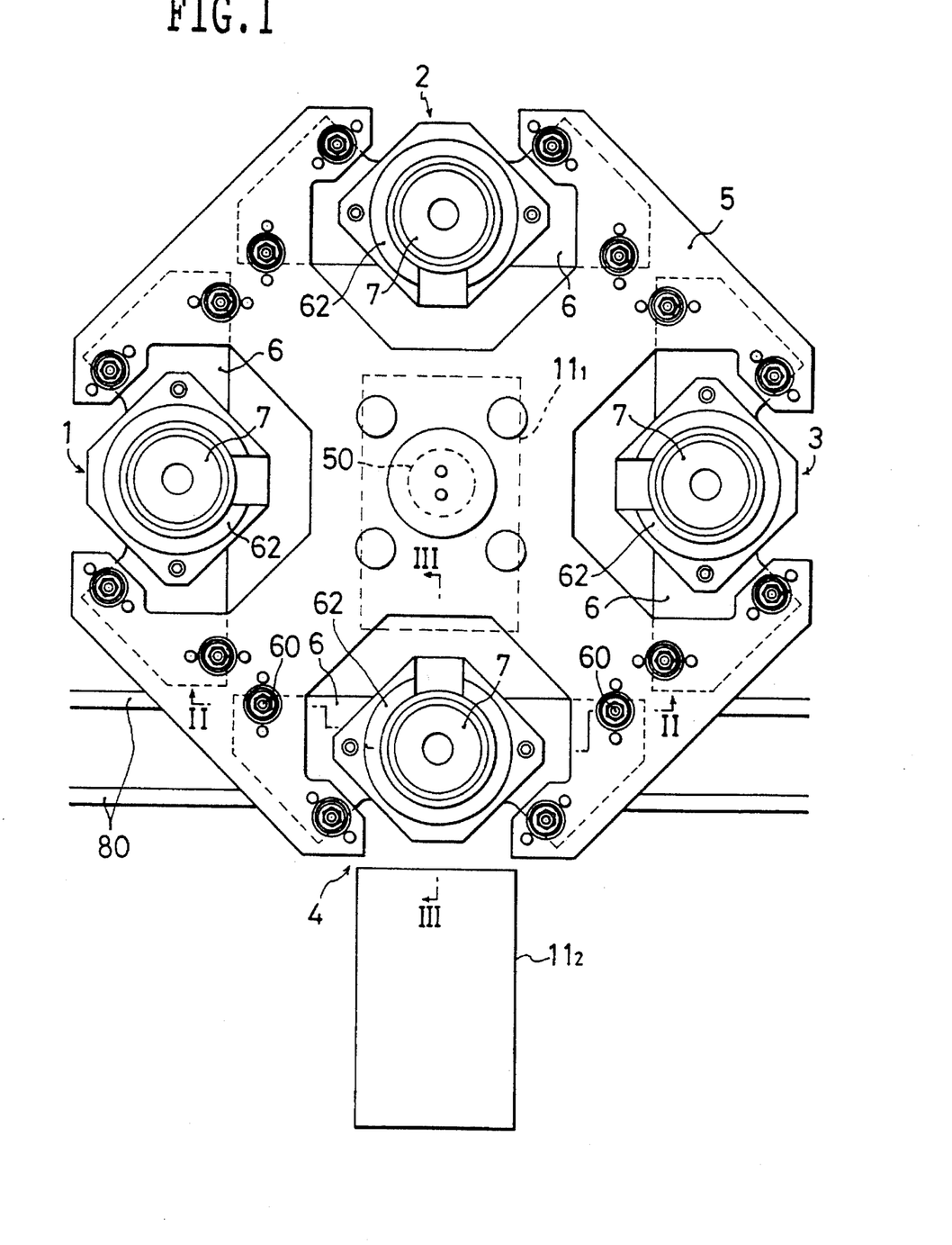
FIG. 1 is a plan view of an assembly line equipment which is used in carrying out the method of the present invention.

FIG. 1 shows an assembly line equipment for assembling the set oil ring. There are disposed in a circular manner a first supply station 1 for the spacer ring, a second supply station 2 for the side rail ring, a third supply station 3 also for the side rail ring and a fourth station 4 for ring assembly. There is provided a supporting frame 5 which is index-rotated (or rotated by indexing) about an axis 50 in the center of disposition of these stations. In the peripheral four positions of this supporting frame 5, there are mounted setting jigs 6. On each setting jig 6 there is supported a guide member 7 which can be fitted onto an external surface of the piston P. Each guide member 7 is sequentially moved to each of the above-described stations by the clockwise index rotation of the supporting frame 5. On a periphery or an external surface of each guide member 7, there are mounted a spacer ring S in the first supply station 1, one side rail ring R each in the second supply station 2 and the third supply station 3 at a distance therebetween in a vertical direction. In the ring assembly station 4 the guide member 7 is fitted from above onto the external surface of the piston P, and the spacer ring S and the pair of the side rail rings R, R are assembled into the piston ring groove G. In each supply station 1, 2, 3 there is disposed, though not illustrated, a ring supply apparatus provided with a magazine in which respective rings are held in a stacked condition, as well as a feeding or picking-up mechanism for mounting one ring at a time onto the guide member 7.

Figure 2:
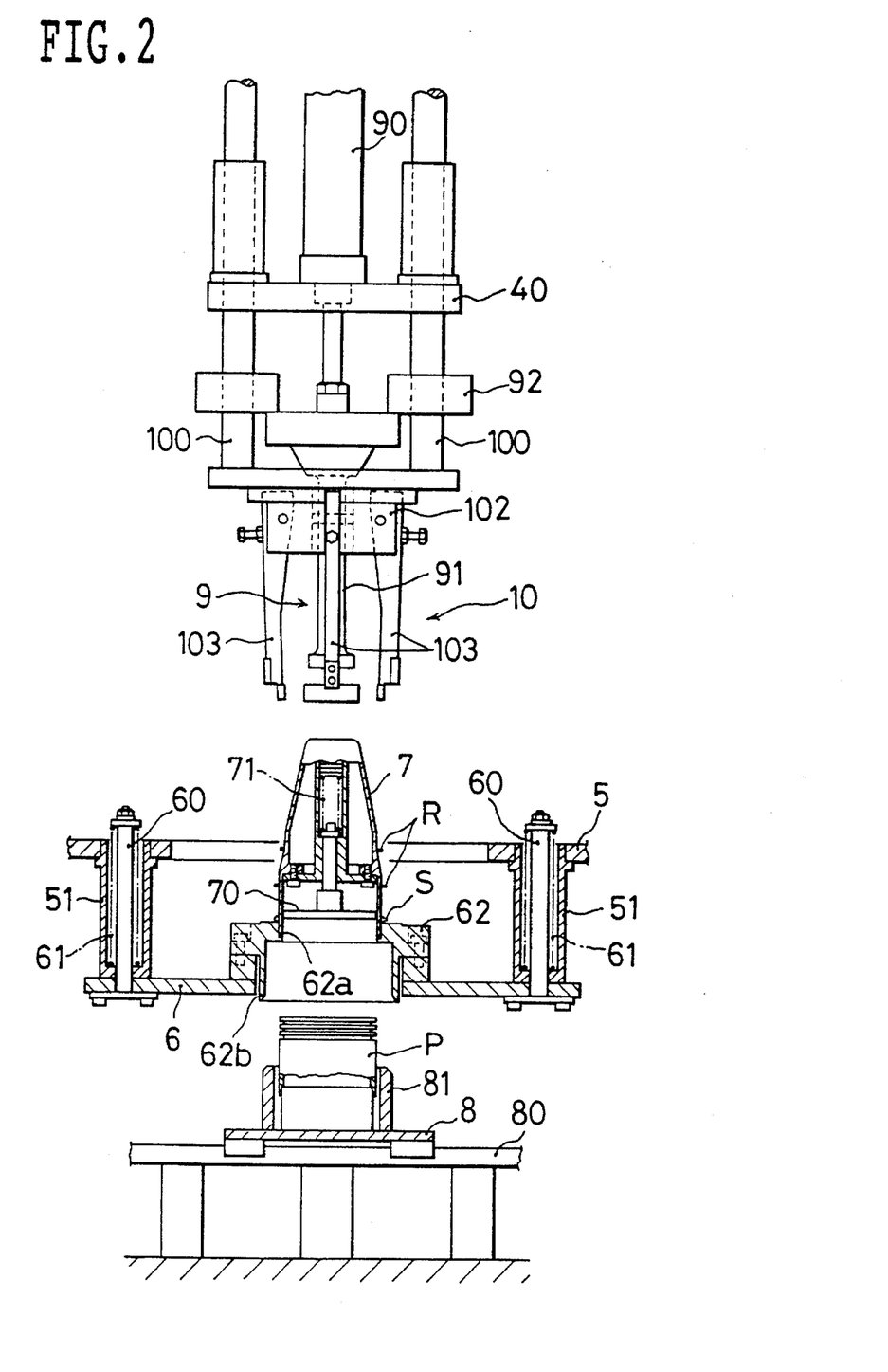
FIG. 2 is a sectional front view taken along the line II—II in FIG. 1.
Figure 3:
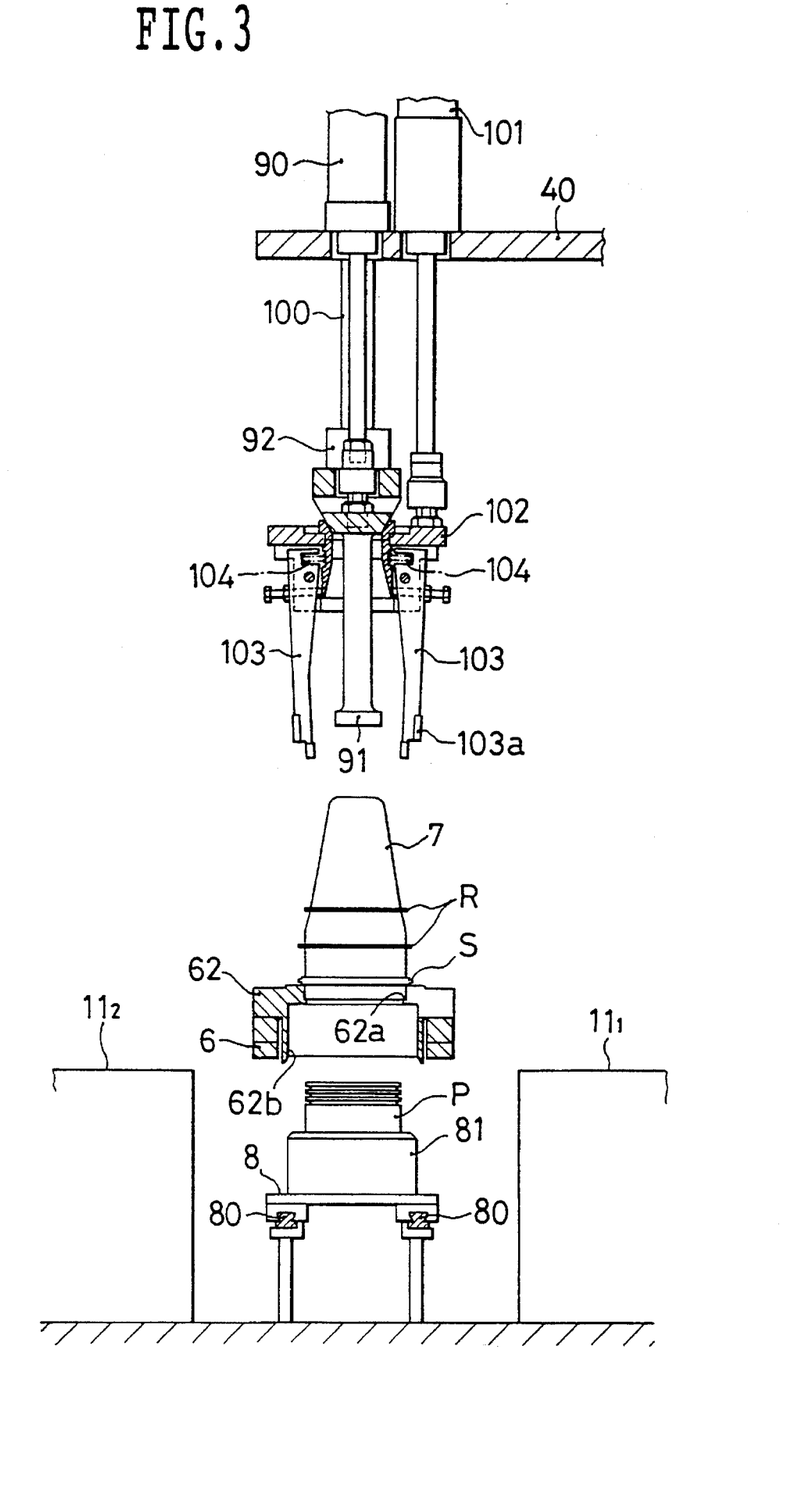
FIG. 3 is a sectional side view taken along the line III—III in FIG. 1.

The piston P is arranged, as shown in FIGS. 2 and 3, to be transported into the ring assembly station 4 in a condition in which it is set by fitting in an upward direction on a pallet 8 which is transported along guide rails 80. The pallet 8 is vertically provided with a cylindrical guide 81 so as to enclose the place in which the piston P is set in position.

In the above-described setting jigs 6, there are vertically provided a plurality of rods 60 to be inserted into a plurality of sleeves 51 which are provided vertically downwards on the supporting frame 5. Each setting jig 6 is supported in a suspended manner by the supporting frame 5 by urging it upwards by means of a spring 61 which is placed on an external surface of each rod 60. In the center of each setting jig 6 there is fixedly provided a ring-shaped jig main body 62 which can be placed onto the external surface of the piston P. On an internal upper portion of the jig main body 62 there is formed a stepped portion 62*a* which receives the lower end of the guide member 7. On the jig main body 62 there is provided a sleeve 62*b* which extends vertically downwards and is fitted onto the external surface of the cylindrical guide 81. It is thus so arranged that, when the setting jig 6 is lowered as described hereinafter, the jig main body 62 is aligned relative to the pallet 8 via the sleeve 62*b* and that the guide member 7 to be supported on the jig main body 62 can surely be fitted onto the external surface of the piston P to be set on the pallet 8.

The guide member 7 is provided on its internal lower portion with a seat plate 70 which comes into abutment with an upper surface of the piston P. The depth of fitting of the guide member 7 relative to the piston P can thus be varied by downwardly urging the seat plate 70 by a spring 71.

In the ring assembly station 4 there are provided thereabove a first pushing member 9 which comes into abutment with the guide member 7 and a second pushing member 10 which comes into abutment with the side rail ring R, on the upper side, that is mounted onto the guide member 7. The first pushing member 9 is made up of a push rod 91 which is moved up and down by a cylinder 90 on a rack 40 which is disposed above the ring assembly station 4. When the push rod 91 is lowered, it comes into abutment with the upper surface of the guide member 7, and the guide member 7 is pushed down together with the setting jig 6 so that the guide member 7 can be fitted from above onto the external surface of the piston P. Further, the cylinder 90 is constituted by a two-stage cylinder so that the fitting position of the guide member 7 relative to the piston P can be changed over into the following two fitting positions, i.e., a first fitting position in which the lower end of the guide member 7 becomes substantially equal in level to the upper groove wall surface and a second fitting position in which the lower end thereof becomes substantially equal in level to the surface of the lower side of the spacer ring S that has already been assembled into the piston ring groove G. The push rod 91 is supported by guide bars 100 so as to be movable up and down via a guide block 92.

The second pushing member 10 is supported in a suspended manner on the rack 40 via the guide bars 100 so as to be movable up and down. The second pushing member 10 is made up of an annular lifting frame 102 which is movable up and down by a cylinder 101 on the rack 40 and a plurality of claw pieces 103 which are suspended from the lifting frame 102. Each of the claw pieces 103 is urged inwards by a spring 104. It is thus so arranged that, when the lifting frame 102 is lowered, the claw pieces 103 move downwards while they are in sliding contact with the external surface of the guide member 7 and therefore that the side rail ring R on the upper side, which is mounted on the guide member 7, is pushed downwards as a result of abutment of the claw pieces 103 therewith. The above-described cylinder 101 is constituted by a two-stage cylinder so that the lowering of the claw pieces 103 can be stopped once at a position shown in FIG. 6A, which is described hereinbelow.

Further, in the ring assembly station 4 there are provided a pair of first and second assembly units $11_1$, $11_2$ on both sides of the transporting path for the pallet 8.

Figure 4:
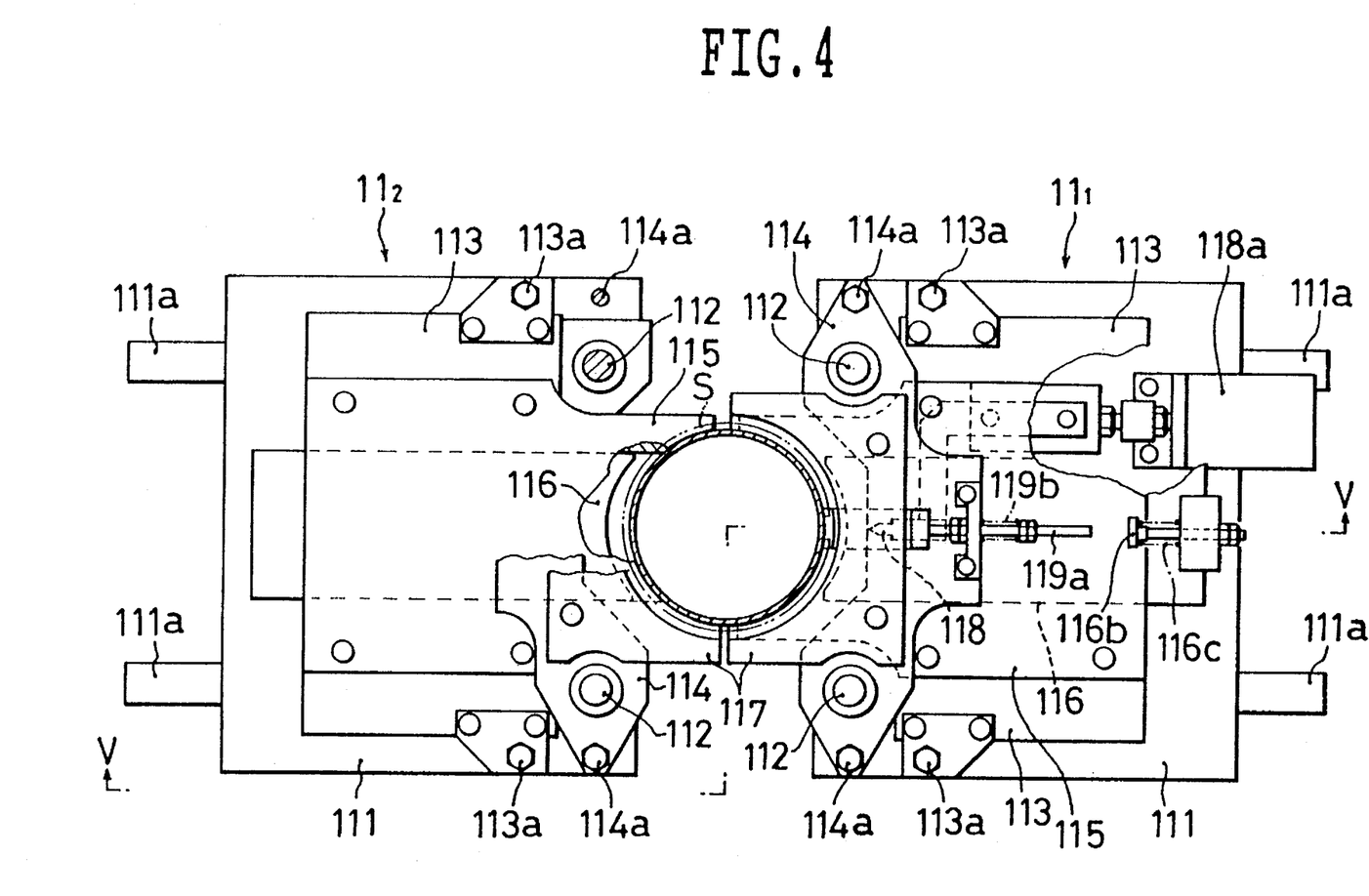
FIG. 4 is an enlarged plan view of a ring assembly station.
Figure 5:
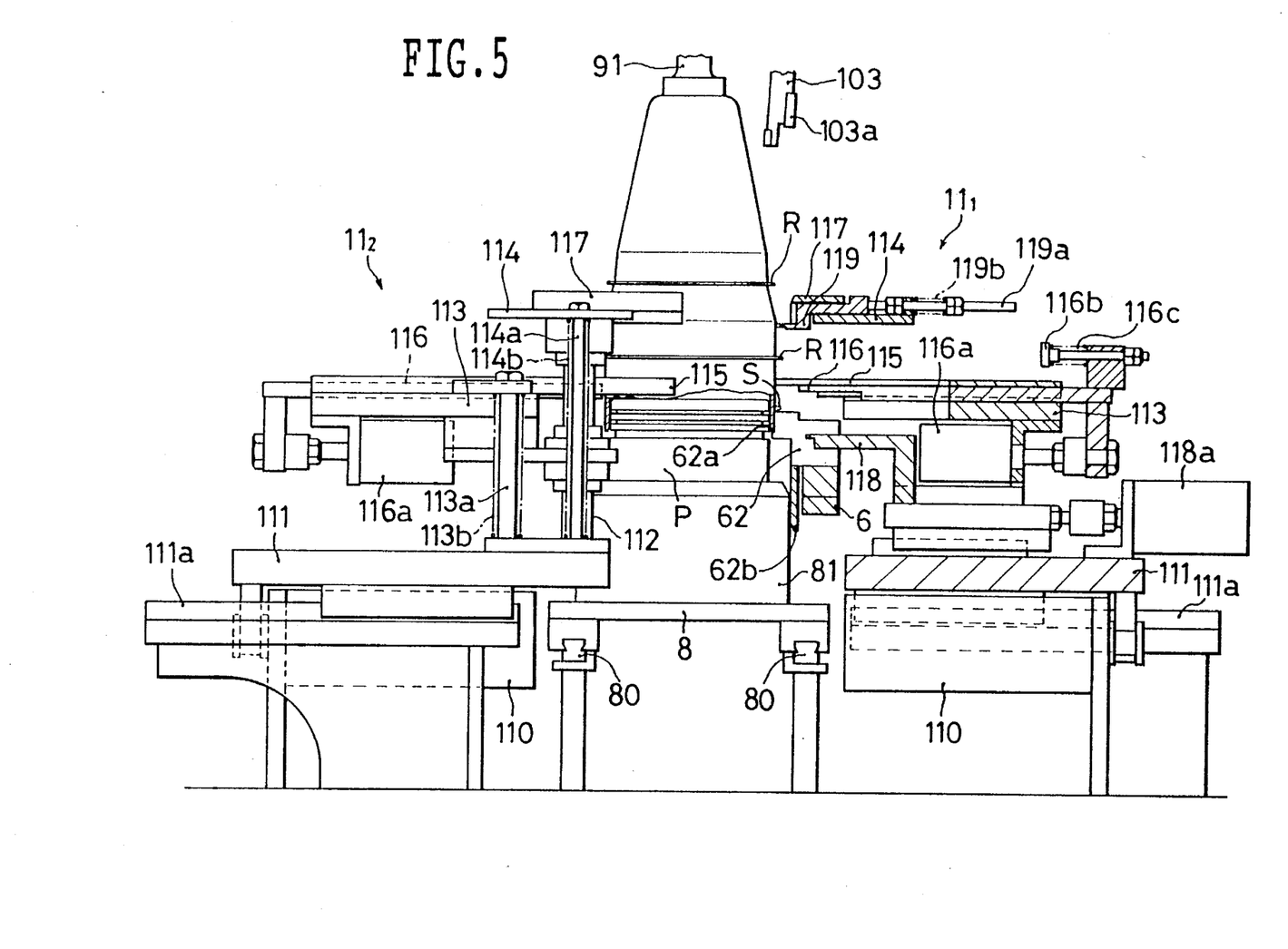
FIG. 5 is a sectional side view taken along the line V—V in FIG. 4.

As shown in FIGS. 4 and 5, each of the assembling units $11_1$, $11_2$ is provided with a slide base 111 which can be moved by a cylinder 110 between an inward operating position and an outward waiting or retracted position along guide rails 111*a*, and a lower first lifting base 113 and an upper second lifting base 114 which are respectively supported, so as to be movable up and down, by a pair of guide bars 112, 112 which are vertically disposed on the sliding base 111. On each of the slide bases 111 there are vertically disposed stopper bolts 113*a*, 114*a* which are provided to penetrate through each of the lifting bases 113, 114. Each of the lifting bases 113, 114 is urged upwards by springs 113*b*, 114*b* which are placed on an external surface of the bolts 113*a*, 114*a*. It is thus so arranged that each of the lifting bases 113, 114 is normally held in a predetermined lifted position which is restricted by the head portion of each of the bolts 113*a*, 114*a*.

On each of the first lifting bases 113, there is stationarily provided a first restricting member 115 which can be interposed into a space between the spacer ring S and the side rail ring R on the lower side which are both mounted on the guide member 7. Further, in a groove on the lower surface of the first restricting member 115, there is slidably engaged a first spacer holding member 116. It is thus so arranged that the first spacer holding member 116 can be moved by a cylinder 116*a*, which is mounted on the lower surface of the first lifting base 113, into and out of a position which is retracted than the first restricting member 115.

On each of the second lifting bases 114, there is stationarily provided a second restricting member 117 which can be interposed into a space between the side rail ring R on the lower side and the side rail ring R on the upper side which are both mounted on the guide member 7. When the claw pieces 103 of the second pushing member 10 are lowered to lower the side rail ring R on the upper side, abutment pieces 103*a*, which are mounted on the claw pieces 103, come into abutment with the second restricting member 117 right before the side rail ring R abuts the second restricting member 117. Thereafter, the second restricting member 117 is lowered together with the second lifting base 114. The second restricting member 117 then comes into abutment with the side rail ring R on the lower side to thereby lower the side rail ring R on the lower side. Further, right before the side rail ring R on the lower side abuts the first restricting member 115, the second restricting member 117 comes into abutment with the first restricting member 115. Thereafter, the first restricting member 115 is lowered together with the first lifting base 113. The spacer ring S is thus pushed down by the abutment with the spacer ring S of the first restricting member 115. The first restricting member 115 comes into abutment with the jig main body 62 of the setting jig 6, thereby pushing down the setting jig 6.

Here, the spacer ring S is mounted on the guide member 7 such that the split ends S2 thereof look towards the first assembly unit 11$_1$. On the first assembly unit 11$_1$ there are still furthermore provided the following members aside from the above-described members. Namely, on the sliding base 111 of the first assembly unit 11$_1$, there is provided an engaging member 118 which can be engaged with the split ends S2 of the spacer ring S in a position on substantially the same level as the piston ring groove G in such a manner as can be moved inwards to and from the piston ring groove G. Further, the second restricting member 117 on the second lifting base 114 is so arranged as to be provided with a second spacer holding member 119 which can be moved to and from an inner position. The second spacer holding member 119 is normally urged to an outward retracted position by means of a spring 119b placed on an external surface of the outwardly extending rod 119a. Further, at the rear end of the first spacer holding member 116, there is provided a rod 116b which lies coaxially with the rod 119a when the second restricting member 117 comes into abutment with the first restricting member 115. It is thus so arranged that, by the inward pushing movement of the first spacer holding member 116, the second spacer holding member 119 is also pushed inwards. By the way, in order to enable the first spacer holding member 116, to move inwardly, even in a condition in which the inward pushing of the second spacer holding member 119 is restricted by the abutment of the second spacer holding member 119 with the external surface of the guide member 7, the above-described rod 116b is constituted by a cushion rod which is urged inwards by a spring 116c. In the above-described jig main body 62, the first lifting bases 113, the first restricting members 115 and the first spacer holding members 116, there are respectively provided grooves to prevent the interference with the above-described engaging member 118.

An explanation will now be made about the procedure of assembling the set oil ring in the ring assembly station 4.

First, the guide member 7 is pushed downwards together with the setting jig 6 by lowering the push rod 91 of the first pushing member 9 to thereby fit the guide member 7 onto the external surface of the piston P. Positioning of the guide member 7 is made to such a first fitting position that the lower end of the guide member 7 becomes substantially the same level as the upper groove wall surface of the ring groove G. In this condition, the slide bases 111 of the pair of the first and the second assembly units 11$_1$, 11$_2$ are advanced to the inner operating position. As shown in FIG. 5, the first restricting member 115 and the second restricting member 117 are thus interposed, respectively, between the spacer ring S and the side rail ring R on the lower side and between the side rail ring R on the lower side and the side rail ring R on the upper side, respectively. Further, the engaging member 118 provided in the first assembly unit 11$_1$ is advanced towards the side of the piston ring groove G through the groove which is formed in the jig main body 62 of the setting jig 6.

Figure 6A:
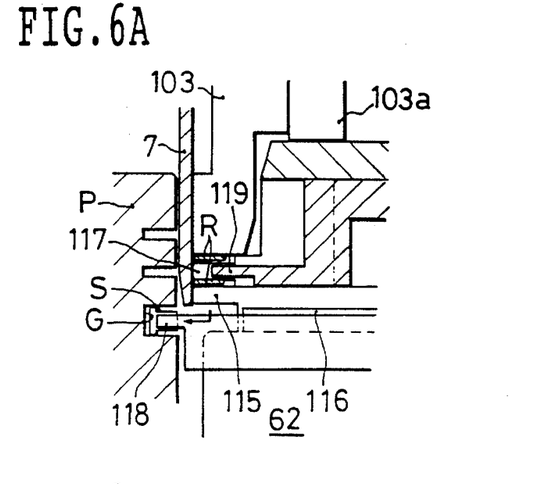
FIG. 6A through FIG. 6E are side views showing the assembling steps.

Then, the claw pieces 103 of the second pushing member 10 are lowered to thereby push down the side rail ring R on the upper side, the second restricting member 117, the side rail ring R on the lower side, the first restricting member 115 and the spacer ring S, as described above. When the first restricting member 115 has lowered to a predetermined position, the first restricting member 115 comes into abutment with the jig main body 62. The jig main body 62 is thus pushed down while leaving the guide member 7 in the first fitting position. Thereafter, as shown in FIG. 6A, the spacer ring S is pushed by the first restricting member 115 from the lower end of the guide member 7, and the spacer ring S is thereby assembled into the piston ring groove G. On this occasion, the engaging member 118 is engaged with the split end portions S2 of the spacer ring S and, therefore, the spacer ring S is assembled into the piston ring groove G while the position of the split end portions S2 is restricted. Therefore, the overlapping of the split ends S2 of the spacer ring S at the time of assembling can surely be prevented.

Figure 6B:
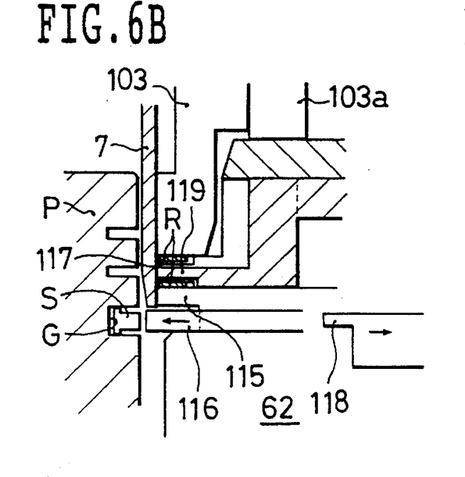
Figure 6C:
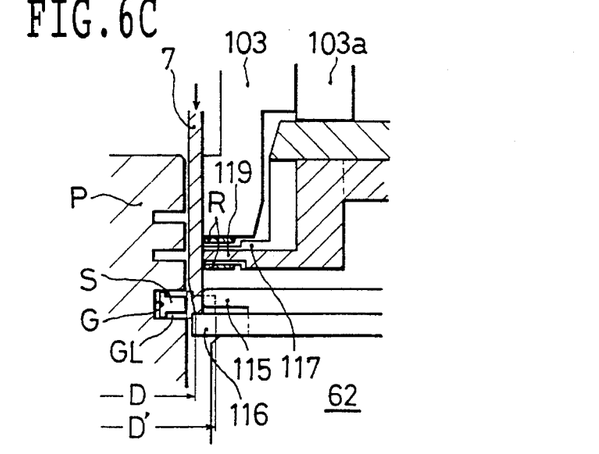
Figure 6D:
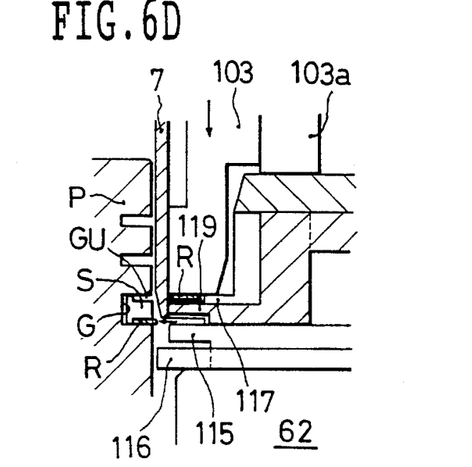

Next, as shown in FIG. 6B, the first spacer holding member 116 is advanced inwards and also the engaging member 118 is retracted to thereby correct the offset in the diametrical direction of the spacer ring S relative to the piston P. In this condition, as shown in FIG. 6C, the guide member 7 is pushed down to a second fitting position in which the lower end of the guide member 7 becomes substantially the same level as the surface of the lower surface of the spacer ring S. Then, the claw pieces 103 are lowered to a lowered end position in which the jig main body 62 comes into abutment with the upper end of the cylindrical guide 81 on the pallet 8. According to this operation, as shown in FIG. 6D, the side rail ring R on the lower side is pushed by the second restricting member 117 from the lower end of the guide member 7 and is assembled into the groove portion GL on the lower side. Here, the inner diameter D of the front end portion of the guide member 7 is set to become smaller than the outer diameter D' of the split end portions of the spacer ring S when the split end portions thereof get overlapped as shown by an imaginary line in FIG. 6C. The overlapping of the split end portions of the spacer ring S by the shock at the time of assembling of the side rail ring R can therefore be prevented.

Figure 6E:
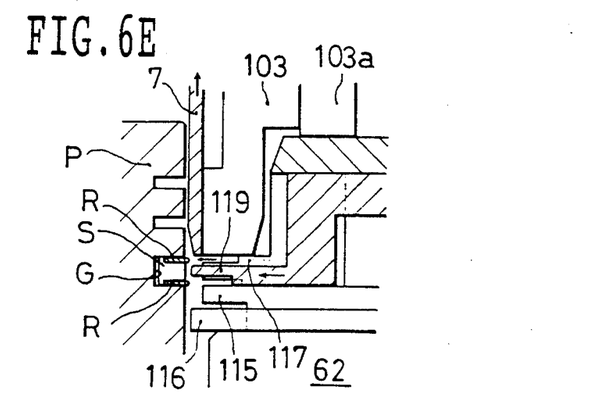

Thereafter, the push rod 91 of the first pushing member 9 is moved upwards while leaving the claw pieces 103 at the lower end position. According to this operation, the guide member 7 is moved upwards by the urging force of the spring 71 of the seat plate 70. When the lowered end of the guide member 7 has been moved to a position above the second spacer holding member 119, the second spacer holding member 119 is projected inwards by the urging force of the spring 116c of the rod 116b which is interlocked with the above-described first spacer holding member 116. Also, when the guide member 7 has been moved upwards to the above-described first fitting position, the side rail ring R on the upper side is pushed out of the lower end of the guide member 7 and is assembled into the groove portion GU on the upper side, as shown in FIG. 6E. In this case, if the distance from the center of the piston to the internal end surface of the second restricting member 117 is made to be below the above-described D', the overlapping of the split end portions of the spacer ring S by the shock at the time of assembling the side rail ring R can be prevented by the second restricting member 117 alone. However, if the second spacer holding member 119 which lies opposite to the split end portions of the spacer ring S is provided and is projected inwards as in this embodying example, the overlapping of the split end portions can be prevented more positively. By the way, it is of course possible to provide the second restricting member 117 on the second lifting base 114 by urging it inwards to thereby omit the second spacer holding member 119.

After the set oil ring has been assembled as described hereinabove, the sliding plates 111 of the pair of the assembly units $11_1$, $11_2$ are moved backwards to the outward retracted position and also the claw pieces 103 of the second pushing member 10 are moved upwards. According to this operation, the setting jig 6 is moved upwards by the urging force of the spring 61. The stepped portion 62a on the upper internal portion of the jig main body 62 is engaged with the lower end of the guide member 7 and the guide member 7 is lifted so as to be disengaged from the piston P. In this condition, the assembled piston P is discharged out of the ring assembly station 4, and the next piston P is transported into the assembly station 4. The supporting frame 5 is also index-rotated to transfer the next setting jig 6 from the third supply station 3 to the ring assembly station 4. A set oil ring is assembled to the next piston by the same procedures as described above.

In the above-described example, an arrangement has been made such that the spacer ring S and the pair of the spacer rings R, R are assembled in the ring assembly station 4. It may, of course, be arranged that a piston P on which the spacer ring S has already been mounted in advance is fed to the ring assembly station 4 and that the side rail rings R, R are assembled in the steps as shown in FIGS. 6D through 6F.

It is readily apparent that the above-described method of assembling a set oil ring on a piston meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of assembling a set oil ring in a piston ring groove having opposed wall surfaces in a piston in spaced relation from an end thereof, the set oil ring comprising a spacer ring and a pair of side rail rings having split end portions wherein the side rail rings are to be placed in the piston ring groove on both sides of the spacer ring, including the steps of:

mounting the pair of side rail rings in axially spaced relation on a periphery of a guide member which can be fitted onto an external surface of the piston;

moving the guide member into concentric fitted disposition with respect to said piston;

sequentially pushing the pair of side rail rings from a front end of the guide member while the guide member is kept fitted onto the external surface of the piston, into first and second groove portions defined between cooperating oppositely spaced surfaces of the spacer ring and the piston ring groove when the spacer ring is positioned in the piston ring groove, said first groove portion being on the side of the spacer ring proximate the end of the piston, and said second groove portion being on the side of the spacer ring away from the end of the piston;

the improvement comprising the steps of:

in assembling one of the side rail rings into the first groove portion, axially moving one of the guide member and the piston relative to the other to a first position to locate the front end of the guide member at substantially the same level as a wall surface of the first groove wall portion, disposing a restricting member in front of the guide member while leaving a clearance exposing the first groove portion, and pushing the one of the side rail rings from the front end of the guide member into the first groove portion while continuously preventing overlap of the split end portions of the spacer ring by the restricting member; and in assembling the other of the side rail rings into the second groove portion, axially moving one of the guide member and the piston relative to the other to a second position to locate the front end of the guide member at substantially the same level as the surface of the spacer ring defining the second groove portion, and pushing the other of the side rail rings from the from end of the guide member into the second groove portion while continuously preventing overlap of the split end portions of the spacer ring by an internal surface of the guide member, whereby the assembling of one of the side rail rings into the first groove portion and the assembling of the other of the side rail rings into the second groove portion are made continuously by sequentially changing the position of the restricting member relative to the first groove portion and the position of the guide member relative to the second groove portion while always preventing overlap of the split end portions of the space ring throughout the assembling steps of the side rail rings.

2. A method of assembling a set oil ring on a piston according to claim 1, wherein:

in assembling the pair of side rail rings, the guide member is moved to the second position; a pushing member, which abuts the side rail ring on a rear side of the guide member, is moved towards the front end of the guide member while disposing the restricting member into a space between the pair of side rail rings, such that the side rail ring adjacent the front end of the guide member is pushed via the restricting member from the front end of the guide member into the second groove portion; thereafter the guide member is moved to the first position while restricting the pushing member and the restricting member to the position in which the side rail ring adjacent the front end of the guide member is pushed; and the guide member is moved from an obstructing relation with respect to the first groove portion, such that the side rail ring on the rear side of the guide member is pushed into the first groove portion.

3. A method of assembling a set oil ring on a piston according to claim 1, wherein the spacer ring and the pair of side rail rings are mounted on the periphery of the guide member in an order placing the spacer ring in a front endmost position followed by the pair of the side rail rings, the method further comprising the steps of: before assembling the pair of side rail rings on the piston, moving an engaging member which can be engaged with the split end portions of the spacer ring in front of the guide member, and pushing the spacer ring from the front end of the guide member into the piston ring groove, whereby the spacer ring is assembled into the piston ring groove while restricting the position of the split end portions thereof by the engaging member.

4. A method of assembling a set oil ring on a piston according to claim 2, wherein the spacer ring and the pair of side rail rings are mounted on the periphery of the guide member in an order placing the spacer ring in a front endmost position followed by the pair of the side rail rings, the method further comprising the steps of: before assembling the pair of side rail rings on the piston, moving an engaging member which can be engaged with the split end portions of the spacer ring in front of the guide member, and pushing the spacer ring from the front end of the guide member into the piston ring groove, whereby the spacer ring is assembled into the piston ring groove while restricting the position of the split end portions thereof by the engaging member.

* * * * *

UNITED STATES PATENT AND TRADEMARK OFFICE
CERTIFICATE OF CORRECTION

PATENT NO.: 5,588,208
DATED    :  December 31, 1996
INVENTOR(S): Yutaka SATO et al.

It is certified that error appears in the above-identified patent and that said Letters Patent is hereby corrected as shown below:

In Claim 1, Column 10, Line 16, change "from" to "front".

Signed and Sealed this

Twentieth Day of May, 1997

*Attest:*

BRUCE LEHMAN

*Attesting Officer*      Commissioner of Patents and Trademarks